(12) United States Patent
Vermeer (10) Patent No.: US 12,339,800 B2
(45) Date of Patent: Jun. 24, 2025

(54) PACKAGE AND INTEGRATED CIRCUIT WITH INTERFACE DETECTION

(71) Applicant: Infineon Technologies Canada Inc., Ottawa (CA)

(72) Inventor: Thomas Vermeer, Plano, TX (US)

(73) Assignee: Infineon Technologies Canada Inc., Ottawa (CA)

( * ) Notice: Subject to any disclaimer, the term of this patent is extended or adjusted under 35 U.S.C. 154(b) by 16 days.

(21) Appl. No.: 18/326,938

(22) Filed: May 31, 2023

(65) Prior Publication Data

US 2024/0403256 A1  Dec. 5, 2024

(51) Int. Cl.
*G06F 13/38* (2006.01)
*G06F 13/40* (2006.01)
*G06F 13/42* (2006.01)

(52) U.S. Cl.
CPC ........ *G06F 13/385* (2013.01); *G06F 13/4022* (2013.01); *G06F 13/4068* (2013.01); *G06F 13/4282* (2013.01); *G06F 13/4295* (2013.01); *G06F 2213/0016* (2013.01)

(58) Field of Classification Search
CPC ............... G06F 13/385; G06F 13/4004; G06F 13/4022; G06F 13/4068; G06F 13/4282; G06F 2213/0016; G06F 13/4295
See application file for complete search history.

(56) References Cited

U.S. PATENT DOCUMENTS 6,439,464 B1 * 8/2002 Fruhauf ................. G06K 19/07
235/492
6,883,715 B1 * 4/2005 Fruhauf ................. G06K 19/07
235/441

(Continued)

FOREIGN PATENT DOCUMENTS

WO    2019070361 A1    4/2019

OTHER PUBLICATIONS

Linka, Bernhard. "Overview of 1-Wire Technology and Its Use". Tutorial 1796. Jun. 19, 2008. Maxim Integrated Products, Inc. (Year: 2008).*

(Continued)

*Primary Examiner* — Thomas J. Cleary
(74) *Attorney, Agent, or Firm* — WORKMAN NYDEGGER (57) ABSTRACT

An integrated circuit that is capable of bidirectional communication with an external host device via various communication protocols. In order to determine which communication protocols the incoming signal is using, the integrated circuit further includes an interface detector. When the interface detector determines that the incoming signal represents a portion of a transaction that uses a first communication protocol, the integrated circuit permits the first communication protocol engine to communicate in the transaction. Likewise, when the interface detector determines that the incoming signal represents a portion of a transaction that uses the second communication protocol, the integrated circuit permits the second communication protocol engine to communicate in the transaction. This allows the integrated circuit to detect the protocol regardless of whether one or two package terminals are used in the protocol.

6 Claims, 6 Drawing Sheets

(56) References Cited

U.S. PATENT DOCUMENTS

| | | | | |
|---|---|---|---|---|
| 7,430,625 | B2* | 9/2008 | Floman | G06F 13/385 |
| | | | | 710/301 |
| 8,245,942 | B2* | 8/2012 | Dischamp | G06K 7/0008 |
| | | | | 235/492 |
| 10,862,730 | B2* | 12/2020 | Vadivelu | H04L 69/08 |
| 2002/0103944 | A1* | 8/2002 | Feuser | G06F 3/002 |
| | | | | 710/2 |
| 2004/0164170 | A1* | 8/2004 | Krygier | G06Q 20/341 |
| | | | | 235/492 |
| 2004/0249625 | A1* | 12/2004 | Leaming | G06K 19/0719 |
| | | | | 703/27 |
| 2005/0005045 | A1* | 1/2005 | Kim | G06K 19/07733 |
| | | | | 710/74 |
| 2006/0026332 | A1* | 2/2006 | Yen | G06F 13/4068 |
| | | | | 710/305 |
| 2006/0047982 | A1* | 3/2006 | Lo | G06F 1/266 |
| | | | | 713/300 |
| 2008/0167828 | A1* | 7/2008 | Terlizzi | H04L 27/32 |
| | | | | 702/64 |
| 2008/0320187 | A1* | 12/2008 | Kim | G06K 7/10297 |
| | | | | 710/100 |
| 2009/0043935 | A1* | 2/2009 | Huomo | G06K 19/07 |
| | | | | 710/301 |
| 2012/0124258 | A1* | 5/2012 | Tailliet | G06F 13/4295 |
| | | | | 710/106 |
| 2013/0086283 | A1 | 4/2013 | Miller et al. | |
| 2013/0297842 | A1* | 11/2013 | Liu | H04L 69/18 |
| | | | | 710/105 |
| 2015/0319273 | A1* | 11/2015 | Trost | H04M 1/0202 |
| | | | | 455/41.1 |
| 2019/0102335 | A1* | 4/2019 | Tan | G06F 13/4221 |
| 2020/0081859 | A1* | 3/2020 | Mishra | G06F 13/4054 |
| 2020/0341683 | A1* | 10/2020 | Liu | G06F 3/0658 |
| 2021/0286744 | A1* | 9/2021 | Norton | G06F 13/4282 |
| 2023/0143302 | A1* | 5/2023 | Chopperla | G06F 1/12 |
| | | | | 713/100 |

OTHER PUBLICATIONS

European Search Report received for Application No./Patent No (24176955.3-1218) on Oct. 8, 2024. 9 Pages.

* cited by examiner

PACKAGE AND INTEGRATED CIRCUIT WITH INTERFACE DETECTION

BACKGROUND

An integrated circuit is an electronic circuit that has all of its components manufactured on a common semiconductor substrate by employing semiconductor processing steps. The integrated circuit features are minute, and the processing steps are imperfect. Accordingly, the final integrated circuit might not operate as originally designed. To correct for this, the integrated circuit can often be fined-tuned using adjustment mechanisms built into the integrated circuit. The adjusting of the integrated circuit to operate more as designed is often referred to as trimming. Trimming is often accomplished by measuring parameters of the integrated circuit (typically after packaging the integrated circuit), determining adjustments that would more closely align the integrated circuit to a more desired state, and then communicating with the integrated circuit to cause the integrated circuit to perform the adjustments.

One common protocol used to communicate with an integrated circuit is referred to as the I2C communication protocol. I2C communication protocol uses two wires including a data wire (also referred to as a data line) and a clock wire (also referred to as a clock line) to transmit and receive data. During I2C communication, data packets are transmitted and received on the data line, and the timing of the data packet transmission and reception is controlled by a clock signal on the clock line.

The subject matter claimed herein is not limited to embodiments that solve any disadvantages or that operate only in environments such as those described above. Rather, this background is only provided to illustrate one example technology area where some embodiments described herein may be practiced.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments described herein relate to an integrated circuit that is capable of bidirectional communication with an external host device via various communication protocols. For example, the communication protocols could include a first communication protocol (e.g., a one-wire communication protocol), and a second communication protocol (e.g., an I2C communication protocol). Accordingly, the integrated circuit includes a first communication protocol engine capable of communicating in the first communication protocol, and a second communication protocol engine capable of communicating in the second communication protocol. In operation, the integrated circuit may communicate with the external host device, for example, in order to receive trimming instructions. In order to receive and transmit communications from and to the external host device, the integrated circuit further includes at least two terminals, referred to as a first terminal and a second terminal.

The integrated circuit is advantageous, in part, because it allows for the integrated circuit to communicate with the external host device while being used in various types of packages that have different amounts of package terminals allocated for communication use for the integrated circuit. For context, a package that includes the integrated circuit may have many (e.g., dozens) total package terminals, but most of those package terminals may be reserved for use for other chips or components contained within the package, or other terminals of the integrated circuit. Thus, for example, the integrated circuit could be included in a package that has only one package terminal allocated for communication use for the integrated circuit, or the integrated circuit could be included in a package that has two package terminals allocated for communication use for the integrated circuit.

In the example of the integrated circuit being used in a package that has only one package terminal allocated for communication use for the integrated circuit, the integrated circuit may have its first terminal connected to the one allocated package terminal, and its second terminal not connected to any package terminal. Thus, in this example, the integrated circuit may communicate with the external host device using only its first terminal, the one allocated package terminal, the first communication protocol engine, and the one-wire communication protocol.

In the example of the integrated circuit being used in a package that has two package terminals allocated for communication use for the integrated circuit, the integrated circuit may have its first terminal connected to the first allocated package terminal, and the second terminal connected to the second allocated package terminal. Thus, in this example, the integrated circuit may also communicate with the external host device using both its first terminal and its second terminal, both allocated package terminals, the second communication protocol engine, and a two-wire communication protocol (such as the I2C communication protocol).

The integrated circuit is structured so as to be able to communicate regardless of whether it is in a package that includes one or two package terminals allocated for communication use for the integrated circuit. That is, when receiving a signal from the external host device via one or both of the first and second terminals, the integrated circuit first determines which of the first or second communication protocols the incoming signal is using. For example, if the integrated circuit is in a package that has two package terminals, the incoming signal could represent a portion of a transaction that uses the first communication protocol, or the incoming signal could represent a portion of a transaction that uses the second communication protocol. Alternatively, if the integrated circuit is in a package that has only one package terminal, the incoming signal will not represent a transaction that uses a two-wire communication. But the integrated circuit stands at the ready in either case.

In order to determine which of the first or second communication protocols the incoming signal is using, the integrated circuit further includes an interface detector. When the interface detector determines that the incoming signal represents a portion of a transaction that uses the first communication protocol, the integrated circuit permits the first communication protocol engine to communicate in the transaction, and prevents the second communication protocol engine from communicating in the transaction. Likewise, when the interface detector determines that the incoming signal represents a portion of a transaction that uses the second communication protocol, the integrated circuit permits the second communication protocol engine to communicate in the transaction, and prevents the first communication protocol engine from communicating in the transaction.

As an example, the interface detector may determine that the incoming signal uses the first communication protocol (e.g., the one-wire communication protocol) when an alternating signal that follows a predetermined alternating pattern is present on the first terminal, but that no alternating signal is present on the second terminal. This could be the case if the first and second terminals are both connected to a respective package terminal, or it could be the case if only the first terminal is connected to a package terminal, and the second terminal is not connected to anything. If the second terminal is not connected to anything, of course, there will be no alternating signal present on the second terminal.

Likewise, the interface detector may determine that the incoming signal uses the second communication protocol (e.g., the I2C communication protocol) when alternating signals that follow predetermined alternating patterns are present on both the first terminal and the second terminal. In this case, the first and second terminals of the circuit each have dedicated package terminals allocated for communication use. But the principles described herein allow the integrated circuit to detect the appropriate communication protocol regardless of whether the package uses two package terminals or one package terminal allocated for communication use for the integrated circuit. Accordingly, the integrated circuit may detect which communication protocol an incoming signal is using (e.g., incoming trimming instructions from a host device), and then communicate according to the proper communication protocol. This is accomplished in a way that allows greater flexibility in the kinds of packages that the integrated circuit can be incorporated into, while still allowing for communication using an appropriate protocol.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the advantages and features of the systems and methods described herein can be obtained, a more particular description of the embodiments briefly described above will be rendered by reference to specific embodiments thereof which are illustrated in the appended drawings. Understanding that these drawings depict only typical embodiments of the systems and methods described herein, and are not therefore to be considered to be limiting of their scope, certain systems and methods will be described and explained with additional specificity and detail through the use of the accompanying drawings in which.

DETAILED DESCRIPTION

Embodiments described herein relate to an integrated circuit that is capable of bidirectional communication with an external host device via various communication protocols. For example, the communication protocols could include a first communication protocol (e.g., a one-wire communication protocol), and a second communication protocol (e.g., an I2C communication protocol). Accordingly, the integrated circuit includes a first communication protocol engine capable of communicating in the first communication protocol, and a second communication protocol engine capable of communicating in the second communication protocol. In operation, the integrated circuit may communicate with the external host device, for example, in order to receive trimming instructions. In order to receive and transmit communications from and to the external host device, the integrated circuit further includes at least two terminals, referred to as a first terminal and a second terminal.

The integrated circuit is advantageous, in part, because it allows for the integrated circuit to communicate with the external host device while being used in various types of packages that have different amounts of package terminals allocated for communication use for the integrated circuit. For context, a package that includes the integrated circuit may have many (e.g., dozens) total package terminals, but most of those package terminals may be reserved for use for other chips or components contained within the package, or other terminals of the integrated circuit. Thus, for example, the integrated circuit could be included in a package that has only one package terminal allocated for communication use for the integrated circuit, or the integrated circuit could be included in a package that has two package terminals allocated for communication use for the integrated circuit.

In the example of the integrated circuit being used in a package that has only one package terminal allocated for communication use for the integrated circuit, the integrated circuit may have its first terminal connected to the one allocated package terminal, and its second terminal not connected to any package terminal. Thus, in this example, the integrated circuit may communicate with the external host device using only its first terminal, the one allocated package terminal, the first communication protocol engine, and the one-wire communication protocol.

In the example of the integrated circuit being used in a package that has two package terminals allocated for communication use for the integrated circuit, the integrated circuit may have its first terminal connected to the first allocated package terminal, and the second terminal connected to the second allocated package terminal. Thus, in this example, the integrated circuit may also communicate with the external host device using both its first terminal and its second terminal, both allocated package terminals, the second communication protocol engine, and a two-wire communication protocol (such as the I2C communication protocol).

The integrated circuit is structured so as to be able to communicate regardless of whether it is in a package that includes one or two package terminals allocated for communication use for the integrated circuit. That is, when receiving a signal from the external host device via one or both of the first and second terminals, the integrated circuit first determines which of the first or second communication protocols the incoming signal is using. For example, if the integrated circuit is in a package that has two package terminals, the incoming signal could represent a portion of a transaction that uses the first communication protocol, or the incoming signal could represent a portion of a transaction that uses the second communication protocol. Alternatively, if the integrated circuit is in a package that has only one package terminals, the incoming signal will not represent a transaction that uses a two-wire communication. But the integrated circuit stands at the ready in regardless of the type of package that it is contained in.

In order to determine which of the first or second communication protocols the incoming signal is using, the integrated circuit further includes an interface detector. When the interface detector determines that the incoming signal represents a portion of a transaction that uses the first communication protocol, the integrated circuit permits the first communication protocol engine to communicate in the transaction, and prevents the second communication protocol engine from communicating in the transaction. Likewise, when the interface detector determines that the incoming signal represents a portion of a transaction that uses the second communication protocol, the integrated circuit permits the second communication protocol engine to communicate in the transaction, and prevents the first communication protocol engine from communicating in the transaction.

As an example, the interface detector may determine that the incoming signal uses the first communication protocol (e.g., the one-wire communication protocol) when an alternating signal that follows a predetermined alternating pattern is present on the first terminal, but that no alternating signal is present on the second terminal. This could be the case if the first and second terminals are both connected to a respective package terminal, or it could be the case if only the first terminal is connected to a package terminal, and the second terminal is not connected to anything. If the second terminal is not connected to anything, of course, there will be no alternating signal present on the second terminal.

Likewise, the interface detector may determine that the incoming signal uses the second communication protocol (e.g., the I2C communication protocol) when alternating signals that follow predetermined alternating patterns are present on both the first terminal and the second terminal. In this case, the first and second terminals of the circuit each have dedicated package terminals allocated for communication use. But the principles described herein allow the integrated circuit to detect the appropriate communication protocol regardless of whether the package uses two package terminals or one package terminal allocated for communication use for the integrated circuit. Accordingly, the integrated circuit may detect which communication protocol an incoming signal is using (e.g., incoming trimming instructions from a host device), and then communicate according to the proper communication protocol. This is accomplished in a way that allows greater flexibility in the kinds of packages that the integrated circuit can be incorporated into, while still allowing for communication using an appropriate protocol.

Figure 1:
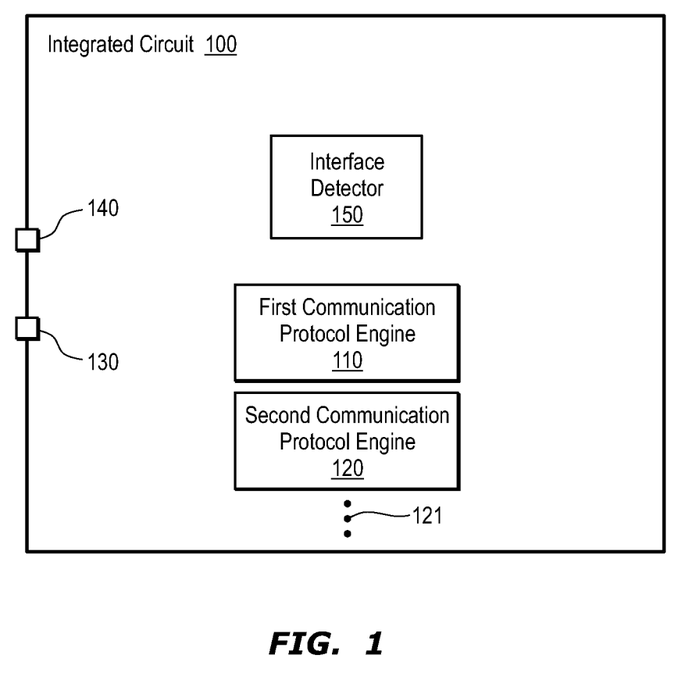
FIG. 1 illustrates an integrated circuit in which the principles described herein may be practiced and which includes an interface detector and two communication protocol engines.

FIG. 1 illustrates an integrated circuit 100 in which the principles described herein may be practiced. The integrated circuit 100 is just one embodiment of the principles described herein. In some embodiments, the integrated circuit 100 is capable of bidirectional communication with an external host device (not illustrated in FIG. 1) via various communication protocols. In addition, the integrated circuit 100 may be packaged within a package, as described later. In operation, the integrated circuit 100 may communicate with the external host device, for example, in order to receive trimming instructions to fine tune performance of devices to account for variation in manufacturing deviations that can occur from device to device, to account for temperature at which the integrated circuit 100 is operating, and/or to account for aging of the integrated circuit.

In some embodiments, the communication protocols could include two communications protocols, but the principles described herein apply to an integrated circuit that is capable of communicating with the external device two or even more communication protocols. The term "first communication protocol" and "second communication protocol" will be used to refer to two of the communication protocols that the integrated circuit 100 may be capable of following.

As an example only, the first communication protocol may be a one-wire communication protocol and the second communication protocol may be a two-wire communication protocol. For instance, that two-wire communication protocol may be the I2C communication protocol. In order to communicate with the external host device in either of the first or second communication protocols, the integrated circuit 100 further includes a first communication protocol engine 110 and a second communication protocol engine 120. The first communication protocol engine 110 is capable of communicating in the first communication protocol, and the second communication protocol engine 120 is capable of communicating in the second communication protocol. The ellipsis 121 represents that if the integrated circuit 100 is capable of communicating using more than just the first communication protocol and the second communication protocol, there may be additional protocol engine(s) for each of those additional communication protocols.

In order to communicate (i.e., to receive and/or transmit signals) with the external host device, the integrated circuit 100 further includes a first terminal 130 and a second terminal 140. The first terminal 130 and the second terminal 140 are communication terminals on which the integrated circuit 100 may potentially receive signals from an external host device. In some embodiments, the integrated circuit 100 may also potentially transmit signals to the external host device via the first terminal 130 and/or the second terminal 140. However, in other embodiments, the integrated circuit may further include one or more additional terminals used to transmit signals to the external host device, as is the case in FIG. 2.

In the case in which the first communication protocol engine 110 communicates using a one-wire communication protocol, the first communication protocol engine 110 uses the first terminal 130 to communicate. In the case in which the second communication protocol engine 120 communicates using a two-wire communication protocol, the second communication protocol engine 120 uses the first terminal 130 and the second terminal 140 to communicate. For instance, in the I2C protocol, one wire is used for a data signal, and the other wire is used for a clock signal. Thus, if the second communication protocol engine 120 uses the I2C communication protocol, the first terminal 130 may be used as a data line over which data signals are transferred, and the second terminal 140 may be used as a clock line over which clock signals are transferred.

The integrated circuit 100 may be incorporated into a package, in which case the first terminal 130 is communicatively coupled to one package terminal (e.g., a pin) of the package (called hereinafter a "first" package terminal). Depending on the package, the second terminal 140 may also be communicatively coupled to another package terminal of the package (called herein a "second" package terminal). However, depending on the package, the second terminal 140 might not be communicatively coupled to another package terminal of the package. Regardless, the integrated circuit 100 may communicate with an external host device via the respective package terminal(s).

In this description and in the claims, circuit elements (e.g., an integrated circuit terminal and a package terminal) are "communicatively coupled" to each other if they are coupled in such a manner that they can communicate with each other in either one direction or both directions. For example, circuit elements that are directly connected by a conductor are "communicatively coupled". However, even if there were intervening circuit elements in the communication path, the circuit elements are still "communicatively coupled" if communication is possible along the communication path.

Accordingly, when the integrated circuit 100 is incorporated into a package, the integrated circuit 100 may communicate with an external host device via the first integrated circuit terminal 130 and the first package terminal. Furthermore, if the second terminal 140 is communicatively coupled to a second package terminal, the integrated circuit may also communicate with the external device via the second integrated circuit terminal 140 and the second package terminal. Embodiments including examples of the integrated circuit 100 being incorporated into packages will be described later with respect to FIGS. 3 and 4.

In order to determine which of the first or second communication protocols an incoming signal is using, the integrated circuit 100 further includes an interface detector 150. When the interface detector 150 determines that the incoming signal represents a portion of a transaction that uses the first communication protocol, the integrated circuit 100 permits the first communication protocol engine 110 to communicate in the transaction, and prevents the second communication protocol engine 120 from communicating in the transaction. Likewise, when the interface detector 150 determines that the incoming signal represents a portion of a transaction that uses the second communication protocol, the integrated circuit 100 permits the second communication protocol engine 120 to communicate in the transaction, and prevents the first communication protocol engine 110 from communicating in the transaction.

In one embodiment, the prevention of a communication protocol engine from communicating in a transaction occurs by blocking further incoming signals of that transaction from passing from the first terminal 130 and/or the second terminal 140 to that communication protocol engine entirely. However, in another embodiment, the prevention of a communication protocol engine from communicating in a transaction occurs blocking any outgoing signals from the communication protocol engine for the duration of the transaction, even if the communication protocol engine is permitted to continue receiving signals of the transaction.

In some embodiments, the interface detector 150 may determine that the incoming signal uses the first communication protocol (e.g., the one-wire communication protocol) when an alternating signal that follows a predetermined alternating pattern is present on the first terminal 130, but that no alternating signal is present on the second terminal 140. This could be the case if the first terminal 130 and the second terminal 140 are both connected to a respective package terminal. But it could also be the case if only the first terminal 130 is connected to a package terminal, and the second terminal 140 is not connected to a package terminal. Of course, if the second terminal 140 is not connected to a package terminal, there will be no alternating signal present on the second terminal 140.

Similarly, the interface detector 150 may determine that the incoming signal uses the second communication protocol (e.g., the I2C communication protocol) when alternating signals that follow predetermined patterns are present on both the first terminal 130 and the second terminal 140. This could be the case if the first terminal 130 and the second terminal 140 were each connected to their own package terminals. However, the principles described herein allow the integrated circuit 100 to detect the appropriate communication protocol regardless of whether the integrated circuit 100 has a second package terminal that is communicatively coupled to the second terminal 140. This allows greater flexibility in the kinds of packages that the integrated circuit 100 can be packaged into, while still allowing for communication using an appropriate protocol.

Figure 2:
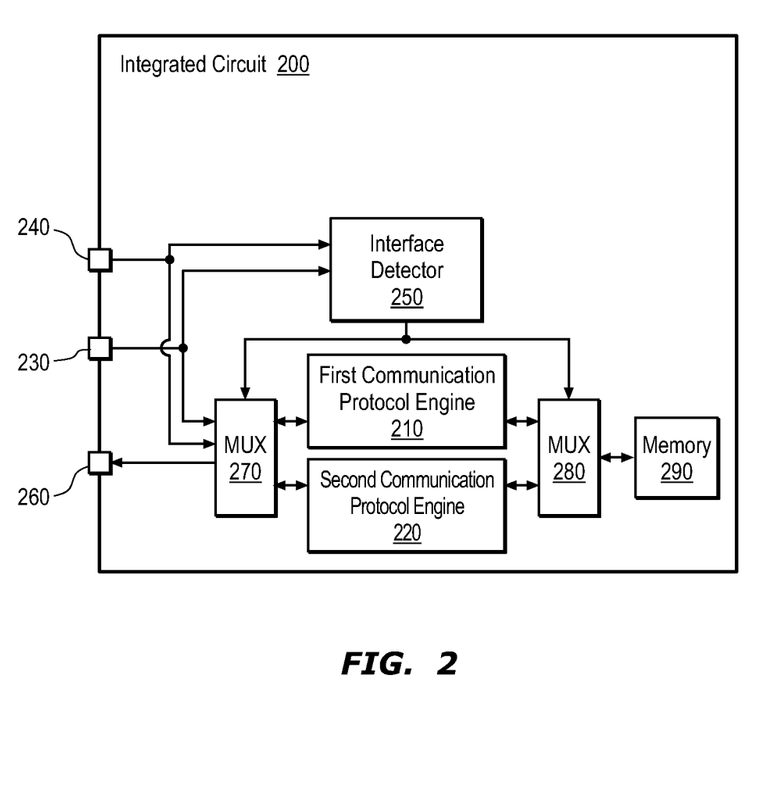
FIG. 2 illustrates an integrated circuit that represents a more specific example of the integrated circuit of FIG. 1

In some embodiments, the integrated circuit 100 may include additional components used to control the enabling and disabling of the first and second communication protocol engines 110 and 120 as appropriate given the detected communication protocol. For example, FIG. 2 illustrates an example integrated circuit 200 that is an example of the integrated circuit 100 of FIG. 1. The integrated circuit 200 includes a first communication protocol engine 210, a second communication protocol engine 220, a first terminal 230, a second terminal 240, and an interface detector 250, which are respective examples of the first communication protocol engine 110, the second communication protocol engine 120, the first terminal 130, the second terminal 140, and the interface detector 150 of FIG. 1.

However, the integrated circuit 200 further includes a third terminal 260, multiplexors 270 and 280, and a memory 290. In this example, the communications from the external host device to the integrated circuit are commands to read from the memory 290 or to write to the memory 290. The integrated circuit 200 uses the multiplexors 270 and 280 to permit and prevent (as appropriate) respective protocol engines from communication in the read/write transaction, depending on which protocol that transaction follows.

As previously described, when a signal is received on at least one of the reception terminals of the integrated circuit, the interface detector 250 determines whether the incoming signal(s) represents a portion of a transaction that uses the first communication protocol, or represents a portion of a transaction that uses the second communication protocol.

Suppose the interface detector 250 detects that the incoming signal is using the first communication protocol. Accordingly, the interface detector 250 configures the multiplexers 270 and 280 to permit the first communication protocol engine 210 to participate in the transaction, and prevent the second communication protocol engine 220 from participating in the transaction.

In this case, to allow the first communication protocol engine 210 to participate in the transaction, the multiplexer 270 is configured to allow signals to pass between the first terminal 230 (and potentially the second terminal 240 if not a one-wire protocol) and the first communication protocol engine 210, and the multiplexer 280 is configured to allow signals to pass between the first communication protocol engine 210 and the memory 290. To prevent the second communication protocol engine 220 from participating in the transaction, the interface detector 250 blocks any signals generated by the second communication protocol engine 220 from passing by the multiplexers 270 and 280, and potentially even blocks any signals received by the multiplexers 270 and 280 from being received by the second communication protocol engine 220.

Suppose instead that the interface detector 250 detects that the incoming signal is using the second communication protocol. Accordingly, the interface detector 250 configures the multiplexers 270 and 280 to permit the second communication protocol engine 220 to participate in the transaction, and prevent the first communication protocol engine 210 from participating in the transaction.

In this case, to allow the second communication protocol engine 220 to participate in the transaction, the multiplexer 270 is configured to allow signals to pass between the terminals 230 and 240 and the second communication protocol engine 220, and the multiplexer 280 is configured to allow signals to pass between the second communication protocol engine 220 and the memory 290. To prevent the first communication protocol engine 210 from participating in the transaction, the interface detector 250 blocks any signals generated by the first communication protocol engine 210 from passing by the multiplexers 270 and 280, and potentially even blocks any signals received by the multiplexers 270 and 280 from being received by the first communication protocol engine 210.

An example transaction that follows a one-wire communication protocol will now be described. First, an incoming signal from an external host device may be received on the first terminal 230. For purposes of explanation and example only, this incoming signal may be a signal that includes an instruction for the integrated circuit 200 to read or write some data to the memory 290. The incoming signal is then passed from the first terminal 230 to both the interface detector 250 and the multiplexor 270. The interface detector 250 then detects that the incoming signal represents a portion of a transaction that uses the one-wire communication protocol. As described above, the interface detector 250 prevents the second communication engine 220 from participating in the transaction, but permits the first communication engine 210 to participate in the transaction for example by performing the following.

The interface detector 250 configures the multiplexors 270 and 280 so as to permit the incoming signal to pass from the multiplexor 270, to the first communication protocol engine 210. The first communication protocol engine 210 generates a corresponding signal that is interpretable by the memory 290. For example, if the incoming signal is a read instruction (or write instruction) formatted in accordance with the first protocol, the first communication engine 210 generates a corresponding read signal (or write signal) in a format recognized by the memory 290. The corresponding signal is then passed through the multiplexer 280 and to the memory 290. The read/write instruction may then be executed in the memory 290.

The memory 290 responds with a response signal. This response signal is passed from the memory 290, through the multiplexor 280, and to the first communication protocol engine 210. The first communication protocol engine 210 generate a corresponding response signal that complies with the first communication protocol. The corresponding response signal is then passed through the multiplexor 270, and to the third terminal 260 for communication back to the external host device.

An example transaction that follows a two-wire communication protocol (e.g., the I2C communication protocol) will now be described. First, incoming signals (e.g., read or write signal) from an external host device may be received on the first terminal 230 and the second terminal 240. The incoming signals are then passed from the first terminal 230 and the second terminal 240 to both the interface detector 250 and the multiplexor 270. The interface detector 250 then detects that the incoming signal represents a portion of a transaction that uses the two-wire communication protocol. As described above, the interface detector 250 prevents the first communication engine 210 from participating in the transaction, but permits the second communication engine 220 to participate in the transaction for example by performing the following.

The interface detector 250 configures the multiplexors 270 and 280 so as to permit the incoming signal to pass from the multiplexor 270, to the second communication protocol engine 220. The second communication protocol engine 220 generates a corresponding signal that is interpretable by the memory 290. The corresponding signal is then passed through the multiplexor 280, and to the memory 290. The read/write instruction may then be executed in the memory 290.

The memory 290 responds with a response signal that is passed through the multiplexor 280, and to the second communication protocol engine 220. The second communication protocol engine 220 generates a corresponding response signal that complies with the second communication protocol. The corresponding response signal is then passed through the multiplexor 270, and to the third terminal 260 for communication back to the external host device.

Figure 3:
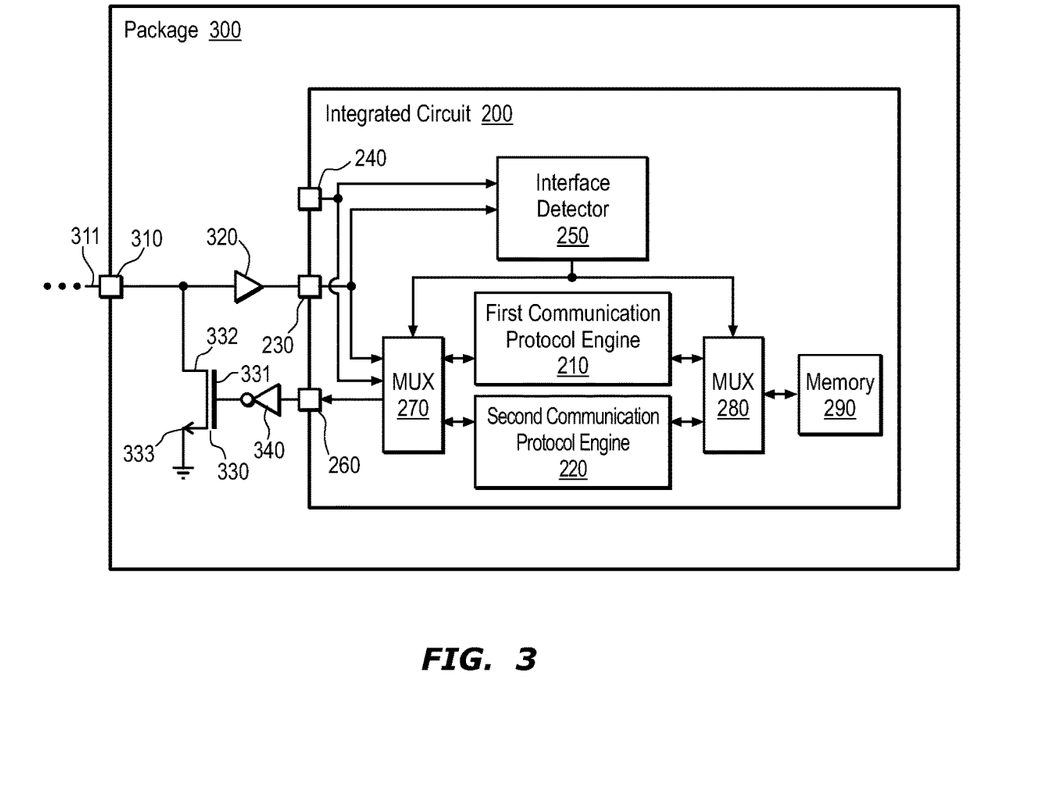
FIG. 3 illustrates the integrated circuit of FIG. 2 being incorporated into a package that has only one package terminal allocated for communication use for the integrated circuit.
Figure 4:
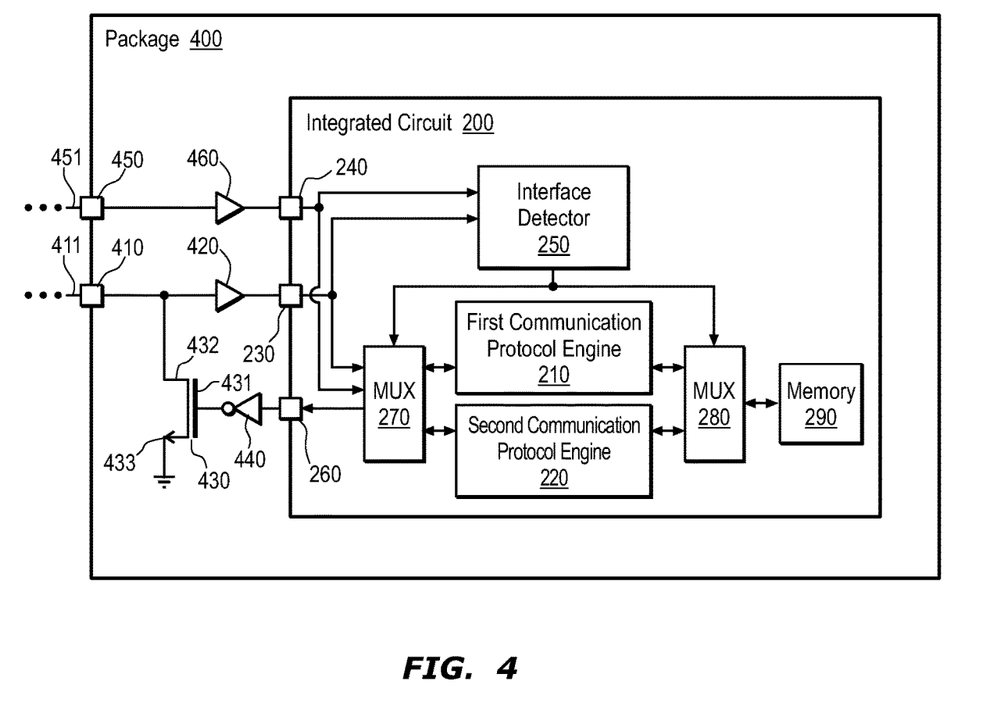
FIG. 4 illustrates the integrated circuit of FIG. 2 being incorporated into a package that has two package terminals allocated for communication use for the integrated circuit.

As previously mentioned, the integrated circuit 200 may be packaged into various different types of packages with varying amounts of package terminals allocated for communication use by the integrated circuit 200. As an example, FIG. 3 illustrates the integrated circuit 200 being incorporated into a package that has only one package terminal allocated for communication use for the integrated circuit 200. On the other hand, FIG. 4 illustrates the integrated circuit 200 being incorporated into a package that has two package terminals allocated for communication use for the integrated circuit 200. FIG. 3 will first be described.

FIG. 3 illustrates a package 300 that includes the integrated circuit 200. The package 300 further includes a single package terminal 310 that is communicatively coupled to both the first terminal 230 and the third terminal 260 of the integrated circuit 200. That is, the package terminal 310 is communicatively coupled to the first terminal 230 via a filter 320, and the package terminal 310 is communicatively coupled to the third terminal 260 via an inverter 340 and a transmission transistor 330. The transmission transistor 330 has a transmission transistor control node 331 that controls whether current flows between a transmission transistor input node 332 and a transmission transistor output node 333 (which may be grounded). In the illustrated embodiment, the transmission transistor 330 is a field-effect transistor, in which case the control node 331 is a gate node, the input node 332 is a drain node, and the output node 333 is a source node connected to ground.

In operation, an incoming signal would be received on the package terminal 310. The incoming signal may include some noise caused by, for example, electrical interference, crosstalk, capacitive coupling, or signal reflections. The filter 320 filters out any noise in the incoming signal before it reaches the first terminal 230. Accordingly, the incoming signal that includes noise may be filtered into a clean binary signal that is more easily readable. Thus, the filter 320 helps facilitate clear and accurate incoming signal reception.

As for incoming signal, as previously described with respect to FIG. 2, the incoming signal would then pass from the first terminal 230 to the interface detector 250 and the multiplexor 270. The interface detector 250 would then determine that the incoming signal represents a portion of a transaction that uses the first communication protocol. Accordingly, the interface detector 250 would then configure the multiplexors 270 and 280 so as to permit the first communication protocol engine 210 to participate in the transaction, and to prevent the second communication protocol engine 220 from participating in the transaction.

As for the outgoing signal, a communication bus 311 may be connected between the package terminal 310 and the external host device. The communication bus may be a pull-up bus that normally high when no signals are transmitted thereon. When a high signal is present on the third terminal 260, a low signal is present at the output of the inverter 340, thereby the transmission transistor 330 is off, and the pull-up bus to remains high. When a low signal is present on the third terminal 260, a high signal is present at the output of the inverter 340, thereby the transmission transistor 330 is on, and the pull-up bus is pulled low. Thus, the inverter 340 and transmission transistor 330 configured as shown cause the binary state that is present at the third terminal 260 to be also present on the communication bus 311, thereby communicating with the external host device.

FIG. 4 illustrates a package 400 that includes the integrated circuit 200, and that has two package terminals allocated for communication use for the integrated circuit 200. The package 400 includes a first package terminal 410, a first filter 420, a transmission transistor 430 and an inverter 440, which are connected, and which operate as described above for the respective package terminal 310, the filter 320, the transmission transistor 330 and the inverter 340 as described with respect to FIG. 3. That is, the first package terminal 410 is communicatively coupled to the first terminal 230 via the first filter 420, and is communicatively coupled to the third terminal 260 via the transmission transistor 430 and the inverter 440. The package 400 further includes a second package terminal 450 and second filter 460. The second package terminal 450 is communicatively coupled to the second terminal 240 via the second filter 460. The first package terminal 410 may be connected to an external host device via communication bus 411; and the second package terminal 450 may connected to an external host device via communication bus 411 and communication bus 451.

As an example, in operation, if an alternating signal that follows a predetermined alternating pattern is received on the first package terminal 410, but no alternating signal is received on the second package terminal 450, the integrated circuit 200 may determine that the incoming signal represents a portion of a transaction that uses the first communication protocol. The interface detector 250 detects this is the case by detecting that the predetermined alternating pattern is received on the first terminal 230, but that no alternating signal is received on the second terminal 240. In response, the integrated circuit 200 in the package 400 may then communicate with the external host device using the first communication protocol, as described with respect to the integrated circuit 200 in the package 300 of FIG. 3.

Alternatively, in operation, incoming signals may be received on the first package terminal 410 and the second package terminal 450. The incoming signals would then be filtered through the respective first filter 420 and second filter 460 before passing to their respective first terminal 230 and second terminal 240. As previously described with respect to FIG. 2, the filtered signals would then be passed to the interface detector 250 (for communication protocol determination) and to the multiplexor 270. The interface detector 250 would then determine that, because the incoming signals are alternating signals that follow predetermined alternating patterns, that the incoming signals are using the second communication protocol (e.g., the I2C communication protocol). Accordingly, the interface detector 250 would then configure the multiplexors 270 and 280 so as to permit the second communication protocol engine 220 to participate in the transaction, and to prevent the first communication protocol engine 210 from participating in the transaction.

Figure 5:
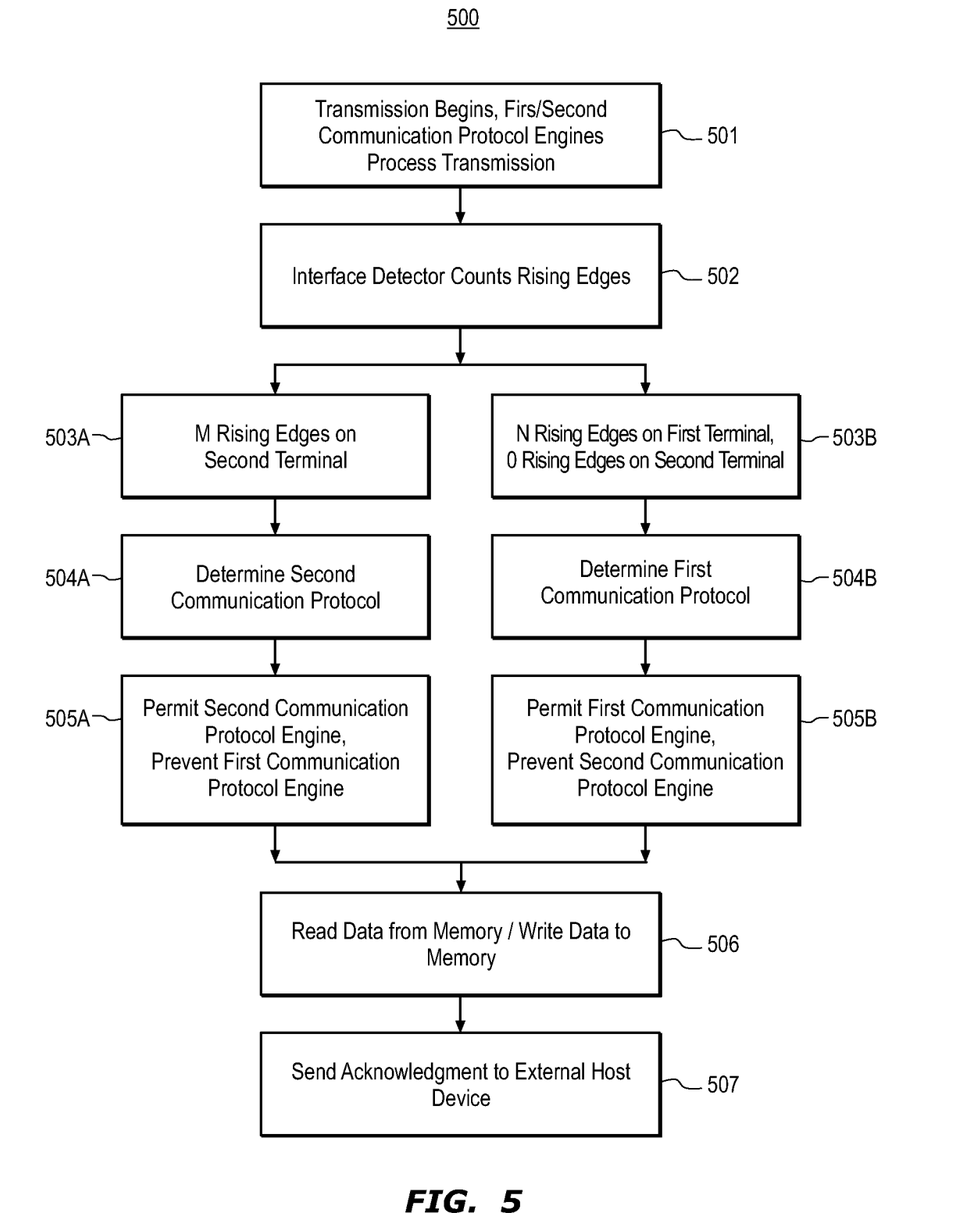
FIG. 5 illustrates a flowchart of a method for detecting a communication protocol in the case in which first communication protocol is a one-wire communication protocol, and the second communication protocol is a two-wire communication protocol.

As previously mentioned, the integrated circuit 200 may use the interface detector 250 to determine which communication protocol an incoming signal is using, and then communicate according to the proper communication protocol, regardless of the type of package the integrated circuit 200 is incorporated into. In one embodiment, the interface detector 250 may determine which communication protocol the incoming signal uses by employing a detection algorithm sequence. FIG. 5 illustrates a flowchart of a method 500 for detecting a communication protocol in the case in which first communication protocol is a one-wire communication protocol, and the second communication protocol is a two-wire communication protocol. As an example, the method 500 may be performed by the interface detector 250 of FIG. 2.

When an external host device begins to transmit signal(s) to the integrated circuit 200, the first communication protocol engine 210 and the second communication protocol engine 220 may both begin to receive the incoming signal(s) (act 501). The interface detector 250 counts the rising edges in the signal received on the first terminal 230 (act 502), and also counts the rising edges in the signal received on the second terminal 240 (also act 502). Of course, if the second terminal 240 is not communicatively coupled to a package terminal, there will be no rising edges detected on the second terminal 240.

The interface detector 250 may count that there have been M number (where "M" is a positive integer) of rising edges in the signal on the second terminal 240 (act 503A), in which case the interface detector 250 determines that the incoming signal(s) represent a portion of a transaction that uses the second communication protocol (which in the example of FIG. 5 is a two-wire communication protocol) (act 504A). This is because there would only be rising edges on the second terminal 240 if the incoming signal(s) represented a portion of a transaction that uses the two-wire communication protocol. Accordingly, the interface detector 250 then permits the second communication protocol engine 220 to communicate in the transaction (act 505A), and prevents the first communication protocol engine 210 from communicating in the transaction (also act 505A).

Alternatively, the interface detector 250 may count that there have been N number (wherein "N" is a positive integer) of rising edges in the signal on the first terminal 230 (act 503B), and zero rising edges on the second terminal 240 (also act 503B), in which case the interface detector 250 determines that the incoming signal represents a portion of a transaction that uses the first communication protocol (e.g., the one-wire communication protocol) (act 504B). Accordingly, the interface detector 250 then permits the first communication protocol engine 210 to communicate in the transaction (act 505B), and prevents the second communication protocol engine 220 from communicating in the transaction (also act 505B).

When the appropriate communication protocol engine 210 or 220 has been permitted to communicate in the transaction, the integrated circuit 200 may then act on any instructions contained within the incoming signal(s). For example, if the signal represents a write instruction, the appropriate communication protocol engine 210 or 220 may write to the memory 290 (act 506). On the other hand, if the signal represents a read instruction, the appropriate communication protocol engine 210 or 220 may read from the memory 290 (also act 506). The integrated circuit 200 may then transmit a transaction acknowledgment signal to the external host device (act 507).

Referring to act 503A of the method 500, the number of rising edges M in the signal on the second terminal 240 could be, for example, 6 rising edges. Likewise, the number of rising edges N (act 503B) in the signal on the first terminal 230 could be, for example, 6 rising edges. While in these examples, the number of rising edges M and N are the same, they could also vary from each other. M and N may be selected so that they are no so low that the interface detector 250 does not misidentify the communication protocol, and not so large that it takes the interface detector 250 too long to identify the communication protocol. The appropriate number of rising edges M or N in a particular embodiment may different based on communication protocol and/or the type of transaction. In some embodiments, the interface detector 250 may instead determine which communication protocol the incoming signal is using after counting a number of falling edges, representing the beginning of each bit frame.

Figure 6:
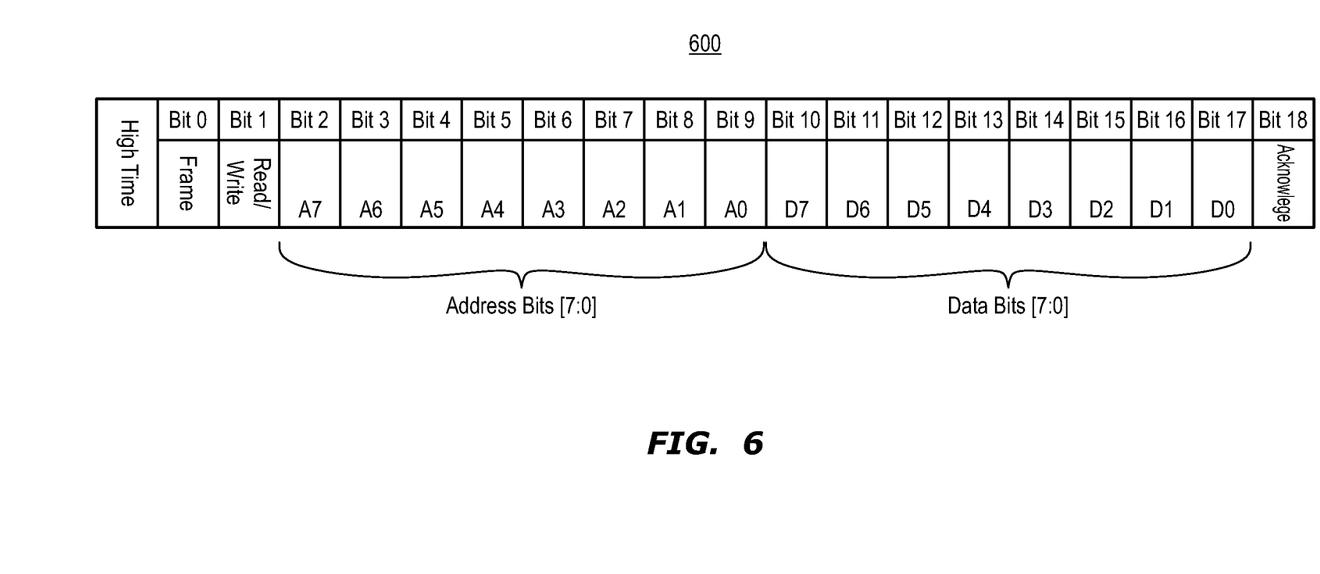
FIG. 6 illustrates an example one-wire transaction that is an example of a transaction that follows a one-wire communication protocol.

As an example, FIG. 6 illustrates an example one-wire transaction 600 containing various fields and is 19 bits long labelled from bit 0 to bit 18 from left to right. The time corresponding to each bit will be referred to herein as a "bit frame". Thus, in FIG. 6, there is illustrated a transaction in which there is first high time, and then bit frames 0 to 18 in sequence. The one-wire transaction 600 is an example of a transaction of a one-wire protocol and may occur between the external host device and the integrated circuit 200. During each bit frame, one of the external host device or integrated circuit is transmitting, but the external host device does transmit for a first portion of the one-wire transaction 600, and the integrated circuit 200 transmits for the remaining portion of the one-wire transaction 600.

The transaction 600 begins with high time (i.e., idle time) on a communication bus communicatively coupled to the first terminal 230. As an example, if the transaction 600 lasts about 200 microseconds, and each bit frame in the transaction 600 lasts 10 microseconds, the high time would also last at least 10 microseconds to give the integrated circuit 200 enough time to reset and prepare to receive data.

Regardless of whether the transaction is in the first portion in which the external host device is transmitting, or the remaining portion in which the integrated circuit 200 is transmitting, the external host device pulls the communication bus down for the first 2.5 microseconds of the bit frame. Whichever of the external host device or integrated circuit 200 is transmitting will allow the communication bus to be pulled back up at the end of the 2.5 microseconds (if transmitting a binary one), or will extend the pull down period to 7.5 microseconds (if transmitting a binary zero). Whichever of the external host device or integrated circuit 200 is receiving will sample 5 microseconds from the start of the bit frame. Thus, if the communication bus is high at sample time, the corresponding bit of the bit frame is interpreted as a binary one. On the other hand, if the communication bus is low at sample time, the corresponding bit of the bit frame is interpreted as a binary zero.

After the high time, the transaction 600 begins with a frame bit (in bit frame 0). The frame bit calibrates the speed of the transaction 600 with the integrated circuit 200. After the frame bit, the transaction 600 includes a read/write bit (in bit frame 1). The read/write bit indicates whether the transaction is a read or a write. For example, in the read/write bit, a binary 1 might correspond to a read instruction, in which case a binary 0 could correspond to a write instruction. After the read/write bit, the transaction 600 includes eight address bits A7:A0 (in bit frames 2 through 9). The address bits indicate which address of memory 290 that is to be operated upon (e.g., which address is to be read from if a read transaction, or written to if a write transaction). After the address bits, the transaction 600 includes eight data bits D7:D0 (in bits 10 through 17). If the read/write bit indicated a write instruction, the data bits represent data that is to be written to the selected address of the memory 290. If the read/write bit indicated a read instruction, the integrated circuit 200 would use the bit frames 10 through 17 to transmit the contents of the selected address back to the external host device. Bit frame 18 is used by the integrated circuit 200 to acknowledge the end of the transaction.

The transaction 600 is a one-wire communication protocol and thus should be handled by the first communication protocol engine 210. However, it does no harm to let the second communication protocol engine 220 listen to the transaction, so long as N (the number or rising edges on the first terminal 230) is selected to be low enough that the interface detector 250 would prevent the second communication protocol engine 220 from participating in the transaction prior to the second communication protocol engine 220 attempting to transmit the communication bus, or write to the memory.

Accordingly, what has been described is an integrated circuit that detects which communication protocol an incoming signal is using, and then communicates according to the proper communication protocol. This is accomplished in a way that allows greater flexibility in the kinds of packages that the integrated circuit can be incorporated into, while still allowing for communication using an appropriate protocol.

Literal Support Section

Clause 1. An integrated circuit comprising: a first terminal; a second terminal; a first communication protocol engine configured to communicate using a first protocol; a second communication protocol engine configured to communicate using a second protocol; and an interface detector connected to the first terminal and the second terminal, and configured to, when signals are received on at least one of the first or second terminal, determine whether or not the signals represent a portion of a transaction that uses the first protocol, and whether or not the signals represent a portion of a transaction that uses the second protocol, wherein the integrated circuit is further configured to permit the first communication protocol engine to communicate in the transaction that uses the first protocol when the interface detector determines that the signals represent the portion of the transaction that uses the first protocol, and the integrated circuit is further configured to permit the second communication protocol engine to communicate in the transaction that uses the second protocol when the interface detector determines that the signals represent the portion of the transaction that uses the second protocol.

Clause 2. The integrated circuit according to Clause 1, wherein the integrated circuit is further configured to, in response to the interface detector determining that the signals represent the portion of the transaction that uses the first protocol, prevent the second communication protocol engine from causing the integrated circuit to send signals in the transaction that uses the first protocol.

Clause 3. The integrated circuit according to Clause 2, the integrated circuit further comprising: a memory; a first multiplexor connected between the first terminal, the second terminal, the first communication protocol engine, the second communication protocol engine, and the interface detector; a second multiplexor connected between the first communication protocol engine, the second communication protocol engine, the interface detector and the memory, the memory being configured to be accessed by the first communication protocol engine and the second communication protocol engine via the memory; and the integrated circuit further being configured to permit the first communication protocol engine to communicate in the transaction that uses the first protocol via the first multiplexor and the second multiplexor, the integrated circuit further being configured to permit the second communication protocol engine to communicate in the transaction that uses the second protocol via the first multiplexor and the second multiplexor, the integrated circuit being configured to prevent the second communication protocol engine from causing the integrated circuit to send signals in the transaction that uses the first protocol via the first multiplexor and the second multiplexor.

Clause 4. The integrated circuit according to Clause 1, wherein the first protocol is a one-wire protocol.

Clause 5. The integrated circuit according to Clause 4, wherein the second protocol is a two-wire protocol.

Clause 6. The integrated circuit according to Clause 5, wherein the interface detector is configured to determine that the signals represent the portion of the transaction that uses the first protocol when the interface detector determines that an alternating signal that follows a predetermined alternating pattern is present on the first terminal, but that an alternating signal is not received on the second terminal.

Clause 7. The integrated circuit according to Clause 6, the predetermined alternating pattern being a first predetermined alternating pattern, and the alternating signal being a first alternating signal, wherein the interface detector is configured to determine that the signals represent the portion of the transaction that uses the second protocol when the interface detector determines that an alternating signal that follows a predetermined alternating pattern is present on the second terminal.

Clause 8. The integrated circuit according to Clause 1, wherein the interface detector is configured to determine that the signals represent a portion of a transaction that uses the second protocol when the interface detector determines that the alternating signal that follows a predetermined alternating pattern is present on the second terminal.

Clause 9. A package comprising: a package terminal; and an integrated circuit, the integrated circuit comprising: a first integrated circuit terminal communicatively coupled to the package terminal; a second integrated circuit terminal; a first communication protocol engine configured to communicate using a first protocol; a second communication protocol engine configured to communicate using a second protocol; and an interface detector connected to the first integrated circuit terminal and the second integrated circuit terminal, and configured to, when signals are received on at least one of the first or second integrated circuit terminal, determine whether or not the signals represent a portion of a transaction that uses the first protocol, and whether or not the signals represent a portion of a transaction that uses the second protocol, wherein the integrated circuit is further configured to permit the first communication protocol engine to communicate in the transaction that uses the first protocol when the interface detector determines that the signals represent the portion of the transaction that uses the first protocol, and the integrated circuit is further configured to permit the second communication protocol engine to communicate in the transaction that uses the second protocol when the interface detector determines that the signals represent the portion of the transaction that uses the second protocol.

Clause 10. The package according to Clause 9, wherein the second integrated circuit terminal is not communicatively coupled to any package terminal of the package.

Clause 11. The package according to Clause 9, further comprising: a filter having an input connected to the package terminal and an output connected to the first integrated circuit terminal.

Clause 12. The package according to Clause 11, the integrated circuit further comprising a third integrated circuit terminal communicatively coupled to the package terminal.

Clause 13. The package according to Clause 12, further comprising a transmission transistor, the transmission transistor having a transmission transistor control node that controls whether current flows from a transmission transistor input node to a transmission transistor output node, the transmission transistor input node being connected to the package terminal, the transmission transistor control node being communicatively coupled to the third integrated circuit terminal.

Clause 14. The package according to Clause 13, further comprising: an inverter having an input connected to the third integrated circuit terminal and an output connected to the transmission transistor control node, the transmission transistor output node being connected ground.

Clause 15. The package according to Clause 9, wherein the package terminal is a first package terminal, the package further comprising a second package terminal being communicatively coupled to the second integrated circuit terminal.

Clause 16. The package according to Clause 15, wherein the package further comprising: a first filter having an input connected to the first package terminal and an output connected to the first integrated circuit terminal; and a second filter having an input connected to the second package terminal and an output connected to the second integrated circuit terminal.

Clause 17. The package according to Clause 16, the integrated circuit further comprising a third integrated circuit terminal communicatively coupled to the first package terminal.

Clause 18. The package according to Clause 17, further comprising a transmission transistor, the transmission transistor having a transmission transistor control node that controls whether current flows from a transmission transistor input node to a transmission transistor output node, the transmission transistor input node being connected to the first package terminal, the transmission transistor control node being communicatively coupled to the third integrated circuit terminal.

Clause 19. The package according to Clause 18, further comprising an inverter having an input connected to the third integrated circuit terminal and an output connected to the transmission transistor control node, the transmission transistor output node being connected ground.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present disclosure may be embodied in other specific forms without departing from its essential characteristics. The described embodiments are to be considered in all respects only as illustrative and not restrictive. All changes which come within the meaning and range of equivalency of the claims are to be embraced within their scope.

When introducing elements in the appended claims, the articles "a," "an," "the," and "said" are intended to mean there are one or more of the elements. The terms "comprising," "including," and "having" are intended to be inclusive and mean that there may be additional elements other than the listed elements.

What is claimed:

1. A package comprising:
   a package terminal; and
   an integrated circuit, the integrated circuit comprising:
      a first integrated circuit terminal communicatively coupled to the package terminal for communication with an external device using a one-wire protocol;
      a second integrated circuit terminal that is not communicatively coupled to any package terminal of the package such that the package is not structured to communicate with the external device using a two-wire protocol;
      a one-wire communication protocol engine configured to communicate using the one-wire protocol by communicating with the first integrated circuit terminal as the one wire, and without using the second integrated circuit terminal;
      a two-wire communication protocol engine for communication using a two-wire protocol by communicating with the first integrated circuit and the second integrated circuit terminal as the two wires; and
      an interface detector connected to the first integrated circuit terminal and the second integrated circuit terminal, and configured to, when signals are received on at least one of the first or second integrated circuit terminal, determine whether or not the signals represent a portion of a one-wire transaction that uses the one-wire protocol, and whether or not the signals represent a portion of a two-tire transaction that uses the two-wire protocol, but since the interface detector is within a package that is not structured to communicate with the external device using the two-wire protocol, the interface detector in the package will not determine that the signals received represent a portion of the a two-wire transaction that uses the two-wire protocol,
      wherein the integrated circuit is further configured to, in response to the interface detector determining that the signals represent the portion of the one-wire transaction that uses the one-wire protocol,
      cause the one-wire communication protocol engine to communicate in the one-wire transaction that uses the one-wire protocol while preventing the two-wire communication protocol engine from communicating in the one-wire transaction.

2. The package according to claim 1, further comprising:
   a filter having an input connected to the package terminal and an output connected to the first integrated circuit terminal.

3. The package according to claim 2, the integrated circuit further comprising a third integrated circuit terminal communicatively coupled to the package terminal.

4. The package according to claim 3, further comprising a transmission transistor, the transmission transistor having a transmission transistor control node that controls whether current flows from a transmission transistor input node to a transmission transistor output node, the transmission transistor input node being connected to the package terminal, the transmission transistor control node being communicatively coupled to the third integrated circuit terminal.

5. The package according to claim 4, further comprising:
   an inverter having an input connected to the third integrated circuit terminal and an output connected to the transmission transistor control node, the transmission transistor output node being connected ground.

6. The integrated circuit according to claim 1, the integrated circuit further comprising:
   a memory;
   a first multiplexor connected between the first integrated circuit terminal, the second integrated circuit terminal, the one-wire communication protocol engine, the two-wire communication protocol engine, and the interface detector;
   a second multiplexor connected between the one-wire communication protocol engine, the two-wire communication protocol engine, the interface detector and the memory; and
   the integrated circuit further being configured to cause the one-wire communication protocol engine to communicate in the one-wire transaction that uses the one-wire protocol via the first multiplexor and the second multiplexor, the integrated circuit being configured to prevent the two-wire communication protocol engine from causing the integrated circuit to send signals in the transaction that uses the one-wire protocol via the first multiplexor and the second multiplexor.

* * * * *